Patented Jan. 12, 1943

2,308,029

UNITED STATES PATENT OFFICE 2,308,029

SULPHONATED RESIN PRODUCT AND METHOD OF PRODUCING

Alfred L. Rummelsburg, Wilmington, Del., assignor to Hercules Powder Company, Wilmington, Del., a corporation of Delaware No Drawing. Application July 31, 1941,
Serial No. 404,837

12 Claims. (Cl. 260—98)

This invention relates to a new class of sulphonation products. More particularly it relates to the products of sulphonation of a substantially petroleum hydrocarbon-insoluble pine wood resin and to a process of production thereof.

It is an object of this invention to provide a new class of sulphonated products having high wetting and detergent characteristics.

Another object of this invention is to provide a process for producing a new class of sulphonation products having high wetting and detergent properties.

Other objects of the invention will appear hereinafter.

The above objects of this invention may be accomplished by treating a substantially petroleum hydrocarbon-insoluble pine wood resin with a sulphonating agent and isolating the sulphonation product formed.

The resin which is sulphonated in accordance with this invention and is characterized by the term "substantially petroleum hydrocarbon-insoluble pine wood resin" herein and in the appended claims, is the resinous material which may be prepared from pine wood, preferably from stump pine wood in the following manner. The pine wood, which may or may not have been steamed to remove volatile constituents such as turpentine and pine oil, may be extracted with a coal tar hydrocarbon such as benzol or toluol, and the extract then freed of volatile constituents, leaving a residue consisting of a mixture of wood rosin and the petroleum hydrocarbon-insoluble resin. Extraction of this mixture with a petroleum hydrocarbon such as, for example, gasoline, dissolves and removes the rosin. After separation of the rosin, high in abietic acid, a resinous residue remains which is low in abietic acid and which is substantially insoluble in petroleum hydrocarbons. Alternatively, the residue of the initial coal tar hydrocarbon extract may be treated with a mixture of a petroleum hydrocarbon, as gasoline, and furfural and the two layers which form separated, in which case the petroleum hydrocarbon-insoluble pine wood resin is found dissolved in the furfural from which it may be obtained by evaporation of the furfural. Other methods of isolating the desired petroleum hydrocarbon-insoluble pine wood resin may be employed, if desired. The resin may be defoamed by steaming or heat treated to remove volatile substances.

This resinous material is characterized by a dark red-brown color, cherry red in solution, and by substantial insolubility in petroleum hydrocarbons; but it will vary somewhat in its specific characteristics such as acid number, melting point, exact petroleum ether solubility, non-carboxylic hydroxyl content and iodine number, depending on the details of the extraction process utilized. The resin will meet or nearly meet the following specifications; namely, substantial insolubility in petroleum hydrocarbons, substantially complete solubility in alcohol, a methoxy content of from about 3 percent to about 7 percent (usually from about 4 percent to about 6 percent), an acid number in the range from about 80 to about 110, a drop melting point from about 95° C. to about 125° C., and a non-carboxylic hydroxyl content of about 5 to about 9 percent.

The sulphonation products of this invention may be prepared by treating the above petroleum hydrocarbon-insoluble pine wood resin with a sulphonating agent, as for example, concentrated or fuming sulphuric acid, sulphur trioxide, chlorosulphonic acid, acetyl sulphuric acid, sulphur trioxide-dioxane complex, as well as others. The sulphonation treatment is carried out at a temperature in the range of about 10° C. to about 150° C. Preferably, temperatures within the range of about 50° C. to about 100° C. will be employed since at these temperatures the rate of reaction is satisfactory and there is little tendency to decomposition of the resin. The sulphonating agents will be used in concentrated form preferably so as to provide maximum reactivity.

The exact mechanism of the sulphonation reaction is not known. The resin contains a relatively high percentage of non-carboxylic hydroxyl groups and may contain components of aromatic character. It appears that sulphation to form sulphates takes place in addition to sulphonation to form sulphonates. For the purposes of describing the invention, sulphonation is considered to include both sulphation and sulphonation. The exact structure of the sulphonated product obtained will vary with variations in the original resin, with the particular sulphonating agent used, the conditions of sulphonation, as well as with other factors. In each case, however, the sulphonation product obtained will be characterized by high wetting-out and detergent characteristics in water solution. The sulphonated product may be neutralized with inorganic or organic bases to form salts. Such water-soluble salts also possess detergent and wetting-out properties in water solution. Thus, the term "sulphonated product" or "sulphonation product" used herein and in the appended claims includes the salts obtained by neutralization of the sulphonates in addition to the sulphonates themselves.

The rate of sulphonation will be dependent on the particular sulphonating agent employed, its concentration, and the temperature at which the treatment is carried out. In general, the reaction time may vary from about one-half hour or less to 12 hours or more, depending upon the reaction conditions. In general, the reaction time will decrease for increases in concentration of sulphonating agent in the reaction mixture.

In order to enable efficient contact of the reactants it will be desirable to carry out the treatment in the presence of a solvent for the substantially petroleum hydrocarbon-insoluble pine wood resin. The solvent used will preferably be inert to the sulphonating agent. Suitable solvents are the chlorinated solvents as, for example, ethylene dichloride, chloroform, methylene chloride, dichloroethyl ether, etc.

If no solvent is employed for the resin other than the sulphonating agent, it will be desirable to use an excess of the sulphonating agent. In this case sulphonating agents such as sulphuric acid of 95 to 105 percent strength will be preferable, although chlorosulphonic acid and acetyl sulphuric acid, for example, may be employed. In the absence of an inert solvent the sulphonation may be carried out, for example, by gradually adding the pine wood resin, preferably in pulverized form, to the sulphonating agent while agitating to thoroughly disperse the solid particles. The amount of sulphonating agent employed may be varied over wide ranges and may amount to as much as ten times the weight of pine wood resin. Preferably, the proportion will be up to about 3 to 1 of sulphonating agent to pine wood resin.

Following the treatment with the sulphonating agent when an inert solvent has not been employed, the sulphonated product may be separated from the excess sulphonating agent by diluting the reaction mixture with water. In the case of sulphuric acid, for example, the dilution may be made to a sulphuric acid of about 30 to 50 percent strength, in which solution the sulphonated pine wood resin is substantially insoluble, thus precipitating the sulphonated product, which may then be removed by filtration. The sulphonated product of the substantially petroleum hydrocarbon-insoluble pine wood resin may also be precipitated or "salted out" of solution by moderate concentrations of inert water-soluble inorganic salts such as sodium chloride, sodium sulphate, sodium phosphate, sodium nitrate, etc. in concentration of about 5 to 20 percent. The yield of sulphonated product obtained by dilution of the sulphonated mixture with water may also be increased by addition of an inorganic salt to the diluted solution, thereby further increasing the insolubility of the sulphonated product in the solution. The sulphonate may likewise be further purified from water-soluble impurities and sulphonating agent by washing with a salt solution or by reprecipitation in a salt solution. If desired, the precipitated sulphonate can be redissolved in water, then neutralized to form its salt, which can in turn be precipitated from its aqueous solution by the addition of suitable inorganic salts such as sodium chloride, sodium phosphate, sodium nitrate, sodium sulphate, etc.

With use of inert solvents in the sulphonation treatment, the amount of sulphonating agent may be varied from about one-tenth to about one and one-half times the weight of resin, and more preferably from about 15 percent to about 50 percent based on the weight of resin. On completion of the sulphonation reaction with use of an inert solvent, the sulphonated product may be recovered by removal of the solvent by evaporation preferably at temperatures below 150° C. to avoid decomposition and if necessary under vacuum. It will be preferable, however, to neutralize the reaction mixture, for example by addition of an organic base or aqueous inorganic base to the mixture prior to the removal of the solvent, since the product is stabilized by the neutralization. If desired, the sulphonated product isolated by evaporation of the solvent may be further purified by washing with salt solutions or by reprecipitation with salt solutions as previously described. Alternatively, and less preferably, the sulphonated product may be extracted from the solvent solution by means of water and then separated from the water by precipitation with salts.

In neutralizing the sulphonated products to form the salts thereof any suitable organic or inorganic base may be used, for example, sodium or potassium hydroxide, sodium or potassium carbonate, ammonium hydroxide or carbonate, calcium or barium hydroxide, triethanolamine, morpholine, aniline, ethylaniline, pyridine, quinoline, etc.

The sulphonated products of this invention, either in the unneutralized form or as salts, exhibit very strong wetting-out, emulsifying, and sudsing properties in water solution, and have proved to be highly desirable from these standpoints. In particular, the sulphonated products may be employed as stabilizing agents in bituminous emulsions, and the emulsions thus stabilized are stable to an extremely wide range of conditions. They may also be advantageously employed in the processing of leather and of certain textiles.

The following examples illustrate the various embodiments of the invention.

*Example 1*

An acetyl sulphuric acid was prepared by treating 408 parts by weight of acetic anhydride slowly with 395 parts by weight of 100% sulphuric acid at 15° C. To 225 parts by weight of this acetyl sulphuric acid, 100 parts by weight of a pulverized substantially petroleum hydrocarbon-insoluble pine wood resin were added over a one-hour period with stirring. The temperature was allowed to increase to 60° C., and the mixture was then maintained at this temperature for a period of 7 hours. After cooling, the reaction mixture was poured into 300 parts by weight of water with stirring and cooling. The sulphonated product was precipitated by adding 60 parts by weight of sodium chloride with agitation, and was filtered off and washed with aqueous 10% sodium chloride solution, and then dried in vacuo at room temperature. There was thus obtained 85 parts by weight of a sulphonated product having high foaming and detergent properties in water.

Fifteen parts by weight of this material were dissolved in 100 parts by weight of water and neutralized with sodium hydroxide. Fifteen parts by weight of sodium chloride were added with vigorous shaking and the mixture allowed to stand for 17 hours at room temperature. The precipitated sodium salt was filtered off and dried as previously. It exhibited similar foaming and detergent properties.

*Example 2*

Two hundred parts by weight of pulverized substantially petroleum hydrocarbon-insoluble pine wood resin were added to 850 parts by weight of 101% sulphuric acid gradually with agitation. The mixture was heated to 80° C. and maintained at this temperature for four hours with agitation before cooling. The reaction mixture was then poured into 1000 parts by weight of cracked ice and water with agitation. This mixture was then poured into 6,500 parts by weight of aqueous 15% sodium chloride solution with agitation. The precipitated sulphonated product was then filtered off, washed with 10% sodium chloride solution and dried. The yield was 175 parts by weight of sulphonated product.

Fifteen parts by weight of the sulphonated material were dissolved in 200 parts by weight of water and neutralized with a slight excess of triethanolamine. By dissolving 15 parts by weight of sodium chloride in this solution with agitation, the triethanolamine salt of the sulphonated product was precipitated. The precipitated salt was filtered off and dried under vacuo at 100° C. The triethanolamine salt showed strong foaming and detergent properties.

*Example 3*

To a solution of 100 parts by weight of substantially petroleum hydrocarbon-insoluble pine wood resin in 300 parts by weight of ethylene dichloride, 40 parts by weight of chlorosulphonic acid were added over a 20-minute period while agitating the solution and maintaining the temperature at 20–30° C. Hydrogen chloride was evolved during the reaction. The reaction mixture was stirred for two hours while gradually increasing the temperature to about 50° C. The solution was then cooled to about 15° C., and neutralized with a slight excess of aqueous 25% sodium hydroxide. The solvent was distilled off by heating to a temperature of about 100° C. The last of the solvent and also water present was finally removed by heating the residue to about 100° C. in vacuo for about 8 hours.

It will be understood that the details and examples hereinbefore set forth are illustrative only, and that the invention as broadly described and claimed is in no way limited thereby.

What I claim and desire to protect by Letters Patent is:

1. A composition of matter comprising a sulphonation product of the substantially petroleum hydrocarbon-insoluble resinous residue remaining after separation of the rosin from the total resinous extract of pine wood.

2. A composition of matter comprising a salt of a sulphonation product of the substantially petroleum hydrocarbon-insoluble resinous residue remaining after separation of the rosin from the total resinous extract of pin wood.

3. A composition of matter comprising a water-soluble salt of a sulphonation product of the substantially petroleum hydrocarbon-insoluble resinous residue remaining after separation of the rosin from the total resinous extract of pine wood.

4. A composition of matter comprising an inorganic water-soluble salt of a sulphonation product of the substantially petroleum hydrocarbon-insoluble resinous residue remaining after separation of the rosin from the total resinous extract of pine wood.

5. A composition of matter comprising an organic water-soluble salt of a sulphonation product of the substantially petroleum hydrocarbon-insoluble resinous residue remaining after separation of the rosin from the total resinous extract of pine wood.

6. The method of preparing a wetting-out and dispersing agent which comprises treating the substantially petroleum hydrocarbon-insoluble resinous residue remaining after separation of the rosin from the total resinous extract of pine wood with a sulphonating agent.

7. The method of preparing a wetting-out and dispersing agent which comprises treating the substantially petroleum hydrocarbon-insoluble resinous residue remaining after separation of the rosin from the total resinous extract of pine wood with a sulphonating agent at a temperature within the range of about 10° C. to about 150° C.

8. The method of preparing a wetting-out and dispersing agent which comprises treating the substantially pretroleum hydrocarbon-insoluble resinous residue remaining after separation of the rosin from the total resinous extract of pine wood dissolved in an organic solvent therefor with a sulphonating agent.

9. The method of preparing a wetting-out and dispersing agent which comprises treating the substantially petroleum hydrocarbon-insoluble resinous residue remaining after separation of the rosin from the total resinous extract of pin wood with a sulphonating agent and separating the sulphonated product from the sulphonation mixture.

10. The method of preparing a wetting-out and dispersing agent which comprises treating the substantially petroleum hydrocarbon-insoluble resinous residue remaining after separation of the rosin from the total resinous extract of pine wood with a sulphonating agent, diluting the sulphonation mixture with water to precipitate the sulphonated product, and purifying the sulphonated product by washing with a salt solution.

11. The method of preparing a wetting-out and dispersing agent which comprises treating the substantially petroleum hydrocarbon-insoluble resinous residue remaining after separation of the rosin from the total resinous extract of pine wood dissolved in an inert organic solvent with a sulphonating agent, separating the sulphonated product from the inert solvent, and recovering the sulphonated product.

12. The method of preparing a wetting-out and dispersing agent which comprises treating the substantially petroleum hydrocarbon-insoluble resinous residue remaining after separation of the rosin from the total resinous extract of pine wood with a sulphonating agent, separating the sulphonated product from the sulphonation mixture, and neutralizing the sulphonation product with a base to form a salt.

ALFRED L. RUMMELSBURG.